Dec. 23, 1952     C. A. COOLLEY     2,623,151
SOLDERING CRUCIBLE
Filed May 19, 1950
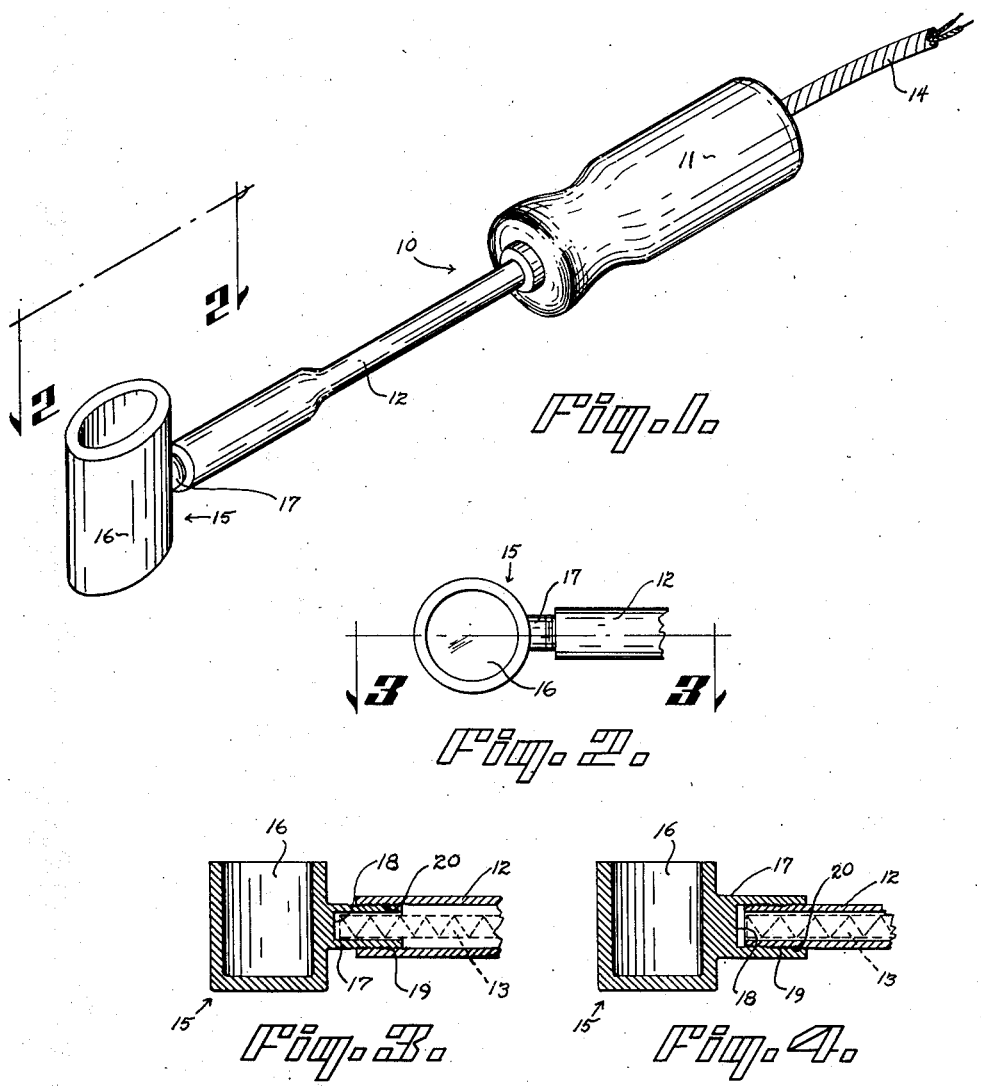
Inventor
Clair Coolley
by M. Talbert Dick
Attorney
Witness
Merle A. Bjork Patented Dec. 23, 1952

2,623,151

UNITED STATES PATENT OFFICE 2,623,151

SOLDERING CRUCIBLE

Clair Ancil Coolley, Centralia, Mo.

Application May 19, 1950, Serial No. 162,912

1 Claim. (Cl. 219—26)

My invention relates to the art of soldering and consists of an attachment for soldering irons of the type having a removable tip.

The art of soldering is an old and crowded one. There are two main types of soldering which are: Sweat soldering and direct soldering. Direct soldering is again broken down into at least two categories which are dip soldering and the technique of heating the objects to be soldered and applying the solder directly thereto from its solid form. A soldering crucible is useful in both main types of soldering. In sweat soldering the pieces to be soldered are covered with a thin coat of solder, which process is known in the art as tinning. This may be done by heating a member with the iron and melting solder on it as in one form of direct soldering, treating the second member in the same fashion, and then heating the two members as their tinned portions are placed together to complete the soldered joint. A second means for doing this is to dip the members to be tinned in a bowl of molten solder. It is this type tinning in the sweat method of soldering that uses the crucible. A form of direct soldering which makes use of the crucible is the soldering of small members such as electrical connections and the like where two or more wires may be twisted together and then dipped in the molten solder.

As a result of the versality of crucibles in various forms of soldering many different types of crucibles have been developed. All of them, however, have the same general purpose which is melting and holding solder in its molten and therefore liquid state. All known forms of these soldering crucibles, however, are special tools which either deny altogether the use of the heating elements therein for any other purpose, or else when used for any other purpose comprise a very bulky, weighty and awkward instrument. Therefore, if one really wishes to have a normal soldering iron and a crucible tool, one must really have two separate instruments. While the need for separate instruments is not objectionable for the professional soldering man, such as the sheet metal worker, it is rather expensive for the amateur repairman. Furthermore, it is rather awkward arrangement even for the professional requiring more and heavier tools in his tool kit should he be a workman who does on-the-job repairing or building. My invention does away with all of these problems by providing an attachment for the ordinary soldering iron which adapts it for crucible work when desired.

It is the principal object of my invention, therefore, to provide a crucible for use with soldering irons having a removable tip.

It is a further object of my invention to provide such a crucible that is simple and therefore both inexpensive and light-weight.

It is still a further object of my invention to provide such a soldering crucible that can be used in a standard soldering iron without altering the structure thereof.

It is still a further object of my invention to provide such a crucible that may be quickly and easily secured and detached from a soldering iron having a removable tip.

Yet another object of my invention is to make such a soldering crucible that is durable in use.

These and other objects will be apparent to those skilled in the art.

My invention consists in the construction, arrangement, and combination of the various parts of the device, whereby the objects contemplated are attained as hereinafter more fully set forth, pointed out in my claim, and illustrated in the accompanying drawings, in which:

Fig. 1 is a perspective view of one form of my soldering crucible secured to a soldering iron.

Fig. 2 is a top view of my soldering crucible secured to a soldering iron of which only a fragment is shown.

Fig. 3 is a cross-sectional view of my soldering crucible taken on the line 3—3 of Fig. 2 as dotted lines illustrating the heating element in contact with the crucible.

Fig. 4 is a cross-sectional view similar to that of Fig. 3 but illustrating a different form of attachment for my crucible.

Referring to the drawings the numeral 10 designates a standard soldering iron having a non-heat conducting handle designated 11 in which a hollow tube designated 12 is secured. A heating element designated 13 is disposed in the end of the tube furtherest from the handle and is capable of being connected to a source of electrical energy by the wires 14 which extend through the handle and the tube and from there to a standard connector plug. So far I have merely described the standard soldering iron and I now wish to specifically set out that portion of the drawings which illustrate my invention particularly.

My invention is a crucible designated 15 that consists of a melting pot of substantially cup shape illustratively shown in the drawings as being round and having straight sides and a flat bottom. The shape of a melting pot, however, is merely a matter of choice. A shaft designated 17 is rigidly secured to the melting pot and extends from it. There are various forms of removable tip irons and those shown for purposes of illustration are of the type where the tip is screw threaded into the end of the tube or similarly secured to the outside of the tube. In both of these cases the shaft which extends from the crucible must be hollow in construction. There are soldering irons which have a heating element that surrounds a solid tip which is held in place with a set screw, however, my crucible could be readily adapted for use with such irons which would not require that the shaft be hollow. In the forms shown for purposes of illustration, however, my shaft designated 17, has a well 18 in its center and screw threads 19 formed on the shaft to match mating screw threads 20 on the soldering iron. Obviously the structure shown in either Fig. 3 or Fig. 4 permits the soldering crucible to be screwed farther or less far onto the soldering iron end 12. In so doing, the electrical element 13 will extend farther or less far into well 18 with a resulting change in the amount of heat imparted to the crucible 15. Any material in the crucible will be subjected to greater heat by screwing the iron farther onto the crucible shaft 17 and conversely the heat will be reduced by unscrewing the crucible partially. It will also be observed that the crucible may be held stationary as with a pair of pliers and the handle turned to change the screw thread relationship of the crucible and iron. Also if the crucible is empty, the iron may be held still and the crucible rotated which will produce the same results. Thus the amount of heat applied to the crucible may be altered without changing the heat created by the electrical element 13.

In operation the soldering iron tip is removed and the shaft of the crucible inserted where the tip is usually secured. The iron is then connected to a source of electrical energy and the heating element is energized which heats the shaft. The heat of the shaft is transmitted to the walls and bottom of the crucible by conduction so that solder placed in the crucible will be melted and held in a molten state until ready for use. It is then possible to either dip small items such as electrical connections and the like in the molten solder or to tin parts by similarly dipping them. Parts thus tinned are then heated until the solder becomes molten again and allowed to cool in contact with each other. Whenever it is desired to use the iron for general soldering purposes, however, it is merely necessary to unscrew the crucible and replace the tip. I have thus created an attachment which greatly increases the versatility of standard soldering irons.

Some changes may be made in the construction and arrangement of my soldering crucible and method of making same without departing from the real spirit and purpose of my invention, and it is my intention to cover by my claim, any modified forms of structure or use of mechanical equivalents which may be reasonably included within its scope.

I claim:

In combination with a soldering iron having a removable tip that is secured to the iron by mating screw threads on the tip and the iron, a crucible comprising: a melting pot, and a hollow screw threaded shaft fixed to said melting pot; the screw threads of said shaft constructed and arranged to substantially duplicate those of said removable tip of said soldering iron; said hollow shaft receiving more or less of the soldering iron heating element selectively as the screw threads of the shaft are screwed farther and less far into said iron.

CLAIR ANCIL COOLLEY.

REFERENCES CITED

The following references are of record in the file of this patent:

UNITED STATES PATENTS

| Number | Name | Date |
| --- | --- | --- |
| 1,690,415 | Kuhn et al. | Nov. 6, 1928 |
| 2,073,259 | Young | Mar. 9, 1937 |
| 2,429,888 | Moore | Oct. 28, 1947 |